US010287427B2

(12) United States Patent
Yarusso et al.

(10) Patent No.: US 10,287,427 B2
(45) Date of Patent: May 14, 2019

(54) COMPOSITIONS BASED ON ACRYLIC BLOCK COPOLYMER BLENDS

(71) Applicant: 3M INNOVATIVE PROPERTIES COMPANY, St. Paul, MN (US)

(72) Inventors: David J. Yarusso, Shoreview, MN (US); Thu-Van T. Tran, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 20 days.

(21) Appl. No.: 15/516,419

(22) PCT Filed: Dec. 1, 2015

(86) PCT No.: PCT/US2015/063073
§ 371 (c)(1),
(2) Date: Apr. 3, 2017

(87) PCT Pub. No.: WO2016/094112
PCT Pub. Date: Jun. 16, 2016

(65) Prior Publication Data
US 2018/0230303 A1   Aug. 16, 2018

Related U.S. Application Data

(60) Provisional application No. 62/088,907, filed on Dec. 8, 2014.

(51) Int. Cl.
| C08L 29/14 | (2006.01) |
| C08L 53/00 | (2006.01) |
| C08F 293/00 | (2006.01) |
| C08J 3/00 | (2006.01) |
| C08L 1/14 | (2006.01) |

(52) U.S. Cl.
CPC .......... *C08L 53/00* (2013.01); *C08F 293/005* (2013.01); *C08J 3/005* (2013.01); *C08L 1/14* (2013.01); *C08L 29/14* (2013.01); *C08J 2301/14* (2013.01); *C08J 2329/14* (2013.01); *C08J 2353/00* (2013.01); *C08J 2401/14* (2013.01); *C08J 2429/14* (2013.01); *C08J 2453/00* (2013.01); *C08L 2205/025* (2013.01); *C08L 2205/03* (2013.01)

(58) Field of Classification Search
CPC ........ C08L 29/14; C08L 53/00; C08J 2429/14
See application file for complete search history.

(56) References Cited

U.S. PATENT DOCUMENTS

| 6,319,985 B1 | 11/2001 | Bruning | |
| 6,806,320 B2 | 10/2004 | Everaerts | |
| 7,072,333 B2 | 7/2006 | Ahn | |
| 8,372,517 B2 | 2/2013 | Tokuchi | |
| 8,455,099 B2 | 6/2013 | Chevalier | |
| 2003/0111519 A1 | 6/2003 | Kinney | |
| 2004/0097658 A1* | 5/2004 | Everaerts | C08F 293/005 525/244 |
| 2009/0105405 A1* | 4/2009 | Graewe | C08L 101/00 524/539 |
| 2010/0058656 A1 | 3/2010 | Chevalier | |
| 2010/0151221 A1* | 6/2010 | Horisawa | C09D 5/18 428/220 |
| 2011/0112247 A1 | 5/2011 | Tokuchi | |
| 2011/0184091 A1* | 7/2011 | Mizuki | C08G 59/4238 523/428 |
| 2012/0260975 A1 | 10/2012 | Gerard | |
| 2014/0030538 A1 | 1/2014 | Boutillier | |

FOREIGN PATENT DOCUMENTS

| CN | 101817975 | 9/2010 |
| EP | 2163571 | 3/2010 |
| EP | 2284221 | 2/2011 |
| EP | 2623525 | 8/2013 |
| JP | 09-324165 | 12/1997 |
| JP | 10-168271 | 6/1998 |
| JP | 2003-040653 | 2/2003 |
| JP | 2005-054065 | 3/2005 |
| JP | 2007-023145 | 2/2007 |
| JP | 2008-106254 | 5/2008 |
| JP | 2009-102467 | 5/2009 |
| WO | WO 2003-012459 | 2/2003 |
| WO | WO 2009-041017 | 4/2009 |
| WO | WO 2009-146227 | 12/2009 |

(Continued)

OTHER PUBLICATIONS

Nahiko et al., electronic translation of JP 10-168271 (Jun. 1998).*
Eastman Product Data Sheet, "Tenite™ Propionate 307E4000018 Clear, TRSP", 2000 [retrieved from the internet on May 25, 2017], URL <http://ws.eastman.com/ProductCatalogApps/PageControllers/ProdDatasheet_PC.aspx?Pro>, pp. 1-2.

(Continued)

*Primary Examiner* — Jeffrey C Mullis
(74) *Attorney, Agent, or Firm* — Kent S. Kokko; Julie A. Lapos-Kuchar

(57) ABSTRACT

Described herein is a composition comprising a polymeric blend of: (i) a first polymer comprising at least one acrylic block copolymer, wherein the at least one acrylic block copolymer comprises: (a) at least two A block polymeric units wherein each A block has a glass transition temperature of at least 90 C and each A block is independently derived from a monoethylenically unsaturated monomer comprising a first (meth)acrylate monomer; and (b) at least one B block polymeric unit wherein the at least one B block has a glass transition temperature no greater than −30 C and wherein the at least one B block is derived from a monoethylenically unsaturated monomer comprising a second (meth)acrylate monomer; and (ii) a second polymer selected from at least one of a polyvinyl acetal resin, a polyvinyl acetate, and a cellulose ester.

14 Claims, No Drawings

(56) References Cited

FOREIGN PATENT DOCUMENTS

| WO | WO 2011-042665 | 4/2011 |
| WO | WO 2012-136941 | 10/2012 |
| WO | WO 2013-019699 | 2/2013 |
| WO | WO 2013-019706 | 2/2013 |
| WO | WO 2013-019766 | 2/2013 |
| WO | WO 2013-019772 | 2/2013 |
| WO | WO 2014-123766 | 8/2014 |
| WO | WO 2016-094277 | 6/2016 |

OTHER PUBLICATIONS

International Search Report for PCT International Application No. PCT/US2015/063073, dated Feb. 26, 2016, 4 pages.

* cited by examiner

COMPOSITIONS BASED ON ACRYLIC BLOCK COPOLYMER BLENDS

CROSS REFERENCE TO RELATED APPLICATIONS

This application is a national stage filing under 35 U.S.C. 371 of PCT/US2015/063073, filed Dec. 1, 2015, which claims the benefit of U.S. Application No. 62/088,907, filed Dec. 8, 2014, the disclosure of which is incorporated by reference in its/their entirety herein.

TECHNICAL FIELD

Acrylic block copolymer blends are disclosed which have desirable physical properties and are halogen-free.

SUMMARY

There is a desire to identify a composition that possesses similar physical properties (such as rheology) to some plasticized PVC (poly(vinyl chloride)) materials such as those used in graphic marking film. There is also a desire for materials free of halogen groups, free of plasticizer, and/or free of acid. Advantageously, the compositions disclosed herein may provide attributes above standard PVC materials such as optical transparency, weathering ability, toughness, etc.

In one aspect, polymeric blends are described comprising:
(i) a first polymer comprising at least one acrylic block copolymer, wherein the at least one acrylic block copolymer comprises:
  (a) at least two A block polymeric units wherein each A block has a glass transition temperature of at least 90° C. and each A block is independently derived from a monoethylenically unsaturated monomer comprising a first (meth)acrylate monomer; and
  (b) at least one B block polymeric unit wherein the at least one B block has a glass transition temperature no greater than −30° C. and wherein the at least one B block is derived from a monoethylenically unsaturated monomer comprising a second (meth)acrylate monomer; and
(ii) a second polymer comprising polyvinyl acetal resin, wherein the polyvinyl acetal resin is obtained by acetalizing a polyvinyl alcohol resin with an aldehyde having 4 or more carbon atoms and an aldehyde having 3 or less carbon atoms, and wherein the polymeric blend is substantially free of plasticizer.

In another aspect, polymeric blends are described comprising:
(i) a first polymer comprising at least one acrylic block copolymer, wherein the at least one acrylic block copolymer comprises:
  (a) at least two A block polymeric units wherein each A block has a glass transition temperature of at least 90° C. and each A block is independently derived from a monoethylenically unsaturated monomer comprising a first (meth)acrylate monomer; and
  (b) at least one B block polymeric unit wherein the at least one B block has a glass transition temperature no greater than −30° C. and wherein the at least one B block is derived from a monoethylenically unsaturated monomer comprising a second (meth)acrylate monomer; and
(ii) a second polymer selected from at least one of polyvinyl acetate and a cellulose ester.

In another aspect, a method of making a polymeric blend is described comprising:
(i) providing a first polymer comprising at least one acrylic block copolymer, wherein the at least one acrylic block copolymer comprises:
  (a) at least two A block polymeric units wherein each A block has a glass transition temperature of at least 90° C. and each A block is independently derived from a monoethylenically unsaturated monomer comprising a first (meth)acrylate monomer; and
  (b) at least one B block polymeric unit wherein the at least one B block has a glass transition temperature no greater than −30° C. and wherein the at least one B block is derived from a monoethylenically unsaturated monomer comprising a second (meth)acrylate monomer;
(ii) blending the first polymer with a second polymer, wherein the second polymer comprising polyvinyl acetal resin, wherein the polyvinyl acetal resin is obtained by acetalizing a polyvinyl alcohol resin with an aldehyde having 4 or more carbon atoms and an aldehyde having 3 or less carbon atoms, and
wherein the polymeric blend is substantially free of plasticizer.

In yet another aspect, a method of making a polymeric blend is described comprising:
(i) providing a first polymer comprising at least one acrylic block copolymer, wherein the at least one acrylic block copolymer comprises:
  (a) at least two A block polymeric units wherein each A block has a glass transition temperature of at least 90° C. and each A block is independently derived from a monoethylenically unsaturated monomer comprising a first (meth)acrylate monomer; and
  (b) at least one B block polymeric unit wherein the at least one B block has a glass transition temperature no greater than −30° C. and wherein the at least one B block is derived from a monoethylenically unsaturated monomer comprising a second (meth)acrylate monomer;
(ii) blending the first polymer with a second polymer, wherein the second polymer is selected from at least one of polyvinyl acetate and a cellulose ester.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B);
"(meth)acrylate" refers to polymeric material that is prepared from acrylates, methacrylates, or derivatives thereof.

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

PVC (poly(vinyl chloride)) has been used in a wide variety of applications due to its low cost, biological and chemical resistance, and workability. However, a disadvantage of PVC is the chlorine content, which creates hazardous and/or acidic byproducts when incinerated. Therefore, there has been growing interest to replace PVC.

It has been discovered that a polymeric blend composition comprising an acrylic block copolymer and a second polymer selected from at least one of (i) polyvinyl acetal resin, (ii) polyvinyl acetate, (iii) cellulose ester, and (iv) combinations thereof results in a composition having similar properties to plasticized PVC used in graphic marking film applications.

First Polymer

The first polymer of the polymeric blend comprises at least one acrylic block copolymer. The polymeric blend may comprise one acrylic block copolymer, two different acrylic block copolymers, or even three different block copolymers or more.

"Block copolymers" of the present disclosure are copolymers in which chemically different blocks or sequences are covalently bonded to each other. Block copolymers include at least two different polymeric blocks that are referred to as the A block and the B block. The A block and the B block in general have different chemical compositions and different glass transition temperatures.

Block copolymers of the present disclosure can be divided into three main classes: tri-block ((A-B-A) structure), multi-block (-(A-B)$_n$— structure), and star block copolymers ((A-B)$_n$— structure). Tri-block, and multi-block structures may also be classified as linear block copolymers. Star block copolymers fall into a general class of block copolymer structures having a branched structure. Star block copolymers are also referred to as radial copolymers, as they have a central point from which branches extend.

The block copolymers of the present disclosure are acrylic block copolymers, comprising at least two A block polymeric units and at least one B block polymeric unit (i.e., at least two A block polymeric units are each covalently bonded to at least one B block polymeric unit). Each A block is derived from a first (meth)acrylate monomer and the B block is derived from second a (meth)acrylate monomer.

The A block tends to be more rigid than the B block (i.e., the A block has a higher glass transition temperature than the B block). As used herein, the term "glass transition temperature" or "Tg" refers to the temperature at which a polymeric material transitions from a glassy state (e.g., brittleness, stiffness, and rigidity) to a rubbery state (e.g., flexible and elastomeric). The Tg can be determined, for example, using techniques such as Differential Scanning Calorimetry (DSC) or Dynamic Mechanical Analysis (DMA).

The block copolymer usually has an ordered multiphase morphology, at least at temperatures in the range of about 25° C. to about 150° C. Because the A block has a solubility parameter sufficiently different than the B block, the A block phase and the B block phase are usually separated. The block copolymer can have distinct regions of reinforcing A block domain (e.g., nanodomains) in a matrix of the softer, elastomeric B blocks. That is, the block copolymer often has discrete, discontinuous A block phase in a substantially continuous B block phase.

In the A block polymeric units, the (meth)acrylate monomers are reacted to form the A blocks. The A block tends to provide the structural and cohesive strength for the (meth) acrylate block copolymer. Any (meth)acrylate monomers can be used as long as the Tg of the resulting A block is at least 90° C. The (meth)acrylate monomers can be, for example, alkyl methacrylates, aryl methacrylates, or aralkyl methacrylate of Formula (I).

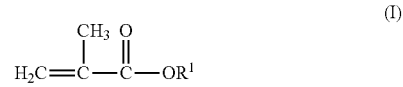

(I)

In Formula (I), $R^1$ is an alkyl, aryl, or aralkyl (i.e., an alkyl substituted with an aryl group). Suitable alkyl groups often have 1 to 6 carbon atoms, 1 to 4 carbon atoms, or 1 to 3 carbon atoms. When the alkyl group has more than 2 carbon atoms, the alkyl group can be branched or cyclic. Suitable aryl groups often have 6 to 12 carbon atoms. Suitable aralkyl groups often have 7 to 18 carbon atoms.

Exemplary alkyl methacrylates according to Formula (I) include: methyl methacrylate, ethyl methacrylate, isopropyl methacrylate, isobutyl methacrylate, tert-butyl methacrylate, cyclohexyl methacrylate, or combinations thereof. In addition to the monomers of Formula (I), isobornyl methacrylate can be used. Exemplary aryl methacrylates according to Formula (I) include: phenyl methacrylate. Exemplary aralkyl methacrylates according to Formula (I) include: benzyl methacrylate, 2-phenoxyethyl methacrylate, or combinations thereof.

The A blocks in the block copolymer can be the same or different. In some block copolymers, each A block is a poly(methyl methacrylate). In more specific examples, the block copolymer can be a triblock or a starblock copolymer where each block is a poly(methyl methacrylate).

The weight average molecular weight (Mw) of each A block is usually at least about 5,000 g/mole. In some block copolymers, the A block has a weight average molecular weight of at least about 8,000 g/mole or at least about 10,000 g/mole. The weight average molecular weight of the A block is usually less than about 30,000 g/mole or less than about 20,000 g/mole. The weight average molecular weight of the A block can be, for example, about 5,000 to about 30,000 g/mole, about 10,000 to about 30,000 g/mole, about 5,000 to about 20,000 g/mole, or about 10,000 to about 20,000 g/mole.

Each A block has a Tg of at least 90° C. In some embodiments, the A block has a Tg of at least 95° C., at least 100° C., or at least 120° C. The Tg is often no greater than 200° C., no greater than 190° C., or no greater than 180° C. For example, the Tg of the A block can be 100° C. to 200° C., 100° C. to 180° C., or 120° C. to 180° C.

The B block polymeric unit is derived from (meth) acrylate monomers. The B blocks can be derived from acrylate monomers of Formula (II).

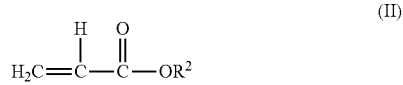

(II)

In Formula (II), $R^2$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or combinations thereof.

In some embodiments, the monomer according to Formula II is an alkyl (meth)acrylate with the alkyl group having 4 to 18, 4 to 10, 4 to 6, or 4 carbon atoms. In some examples, the monomer is an acrylate. Polymers made from acrylate monomers tend to be less rigid than their methacrylate counterparts.

Exemplary alkyl acrylates of Formula (II) that can be used to form the B block polymeric unit include: ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, dodecyl acrylate, or combinations thereof.

Exemplary heteroalkyl acrylates of Formula (II) that can be used to form the B block polymeric unit include: 2-methoxyethyl acrylate, 2-ethoxyethyl acrylate, or combinations thereof.

Some alkyl methacrylates can be used to prepare the B blocks such as, e.g., alkyl methacrylates having an alkyl group with greater than 6 to 20 carbon atoms. Exemplary alkyl methacrylates include: 2-ethylhexyl methacrylate, isooctyl methacrylate, n-octyl methacrylate, isodecyl methacrylate, lauryl methacrylate or combinations thereof. Likewise, some heteroalkyl methacrylates such as, e.g., 2-ethoxy ethyl methacrylate can also be used.

The B block typically has a Tg that is no greater than −30° C. In some embodiments, the B block has a Tg that is no greater than −40° C., no greater than −50° C., or no greater than −60° C. The Tg often is no less than −80° C., no less than −70° C., or no less than −50° C. For example, the Tg of the B block can be −70° C. to −30° C., −60° C. to −30° C., or −50° C. to −30° C.

The weight average molecular weight of the B block is usually at least about 30,000 g/mole. In some block copolymers, the B block has a weight average molecular weight of at least about 40,000 g/mole or at least about 50,000 g/mole. The weight average molecular weight is generally no greater than about 200,000 g/mole. The B block usually has a weight average molecular weight no greater than 150,000 g/mole, no greater than about 100,000 g/mole, or no greater than about 80,000 g/mole. In some block copolymers, the B block has a weight average molecular weight of about 30,000 g/mole to about 200,000 g/mole, about 30,000 g/mole to about 100,000 g/mole, about 30,000 g/mole to about 80,000 g/mole, about 40,000 g/mole to about 200,000 g/mole, about 40,000 g/mole to about 100,000 g/mole, or about 40,000 g/mole to about 80,000 g/mole.

The block copolymers usually contain 20 to 70 weight percent A block and 30 to 80 weight percent B block based on the weight of the block copolymer. For example, the copolymer can contain 20 to 70 weight percent A block and 30 to 80 weight percent B block, 25 to 65 weight percent A block and 35 to 75 weight percent B block, 30 to 60 weight percent A block and 40 to 70 weight percent B block, 35 to 60 weight percent A block and 40 to 65 weight percent B block, or 35 to 55 weight percent A block and 45 to 65 weight percent B block. Higher amounts of the A block tend to increase the stiffness or modulus of the copolymer, which can be used to optimize properties of the composition such as the mechanical strength and modulus.

In one particular embodiment, the acrylic block copolymer is a tri-block copolymer and each A block comprises the reaction product of alkyl methacrylate monomers and the B block comprises the reaction product of alkyl (meth)acrylates monomers. See, for example, U.S. Pat. Appl. No. 61/057,532 (Joseph et al.) for a further description of these A and B block copolymers and the selection of monomers.

The block copolymer may comprise other functional monomeric units, however they are typically randomly distributed throughout one or more of the acrylic blocks in the block copolymer. Blocks A and/or B can comprise other (meth)acrylic comonomers having various functional groups known to a person skilled in the art, for example, acid, amide, amine, hydroxyl, epoxy, or alkoxy functional groups. For example, polar monomers can be used to adjust the Tg (so long as the Tg is maintained within the claimed Tg) or the cohesive strength of the block. Additionally, the polar monomers can function as reactive sites for chemical or ionic crosslinking, if desired. Exemplary polar monomers include, but are not limited to, (meth)acrylic acid; (meth)acrylamides such as N-alkyl (meth)acrylamides and N,N-dialkyl (meth)acrylamides; hydroxy alkyl (meth)acrylates; and N-vinyl lactams such as N-vinyl pyrrolidone and N-vinyl caprolactam. In one embodiment, the A block can contain up to 10, 8, 6, or even 4 weight percent of a polar monomer while the B block can include up to about 30, 25, 20, 15, or even 10 weight percent of polar monomers.

Any technique that produces well-controlled block and block copolymer structures can be used to prepare the block copolymers. As used herein, the term "well-controlled" refers to block or block copolymer structures that have at least one of the following characteristics: controlled molecular weight, low polydisperistiy, well-defined blocks, or blocks having high purity.

The blocks and block copolymers usually have low polydispersity. As used herein, the term "polydispersity" is a measure of the molecular weight distribution and refers to the weight average molecular weight (Mw) divided by the number average molecular weight (Mn) of the polymer. Materials that are all of the same molecular weight have a polydispersity of 1.0 while materials that have more than one molecular weight have a polydispersity greater than 1.0. The polydispersity can be determined, for example, using gel permeation chromatography. Some blocks and block copolymer have a polydispersity of 2.0 or less, 1.5 or less, or 1.2 or less.

In some block copolymers, the boundaries between the nanodomains containing the A blocks and the continuous phase containing the B blocks are well defined (i.e., the boundaries are essentially free of tapered structures—structures derived from monomers used for both the A and B blocks).

Some A blocks and B blocks have high purity. For example, the A blocks can be essentially free of segments derived from monomers used during the preparation of the B blocks. Similarly, B blocks can be essentially free of segments derived from monomers used during the preparation of the A blocks.

Methods of making acrylic block copolymers are known in the art, for example, in U.S. Pat. No. 6,806,320 (Everaerts et al.) and are commercially available, for example from Kuraray CO., Tokyo, Japan under the trade designation "KURARITY" and from Arkema Chemicals Co., Colombes, France.

The acrylic block copolymers of the present disclosure may have a number average molecular weight (Mn) of at least 46,000 daltons, at least 100,000 daltons, at least 300,000 daltons, at least 1,000,000 daltons, or even at least 1,600,000 daltons. In one embodiment, the acrylic block copolymers have a molecular weight between 75,000 and 150,000 daltons.

In one embodiment the acrylic block copolymer comprises at least 25, 30 or even 35 wt % and at most 70, 65, 60, or even 55 wt % PMMA (polymethyl methacrylate).

In some embodiments, more than one block copolymer is used. For example, two or more block copolymers with different weight average molecular weights or two or more block copolymers with different concentrations of the block polymeric units can be used. The use of multiple block copolymers with different weight average molecular weights or with different amounts of the block polymeric units can, for example, improve the mechanical properties of composition.

Second Polymer

The acrylic block copolymer is blended with a second polymer, wherein the second polymer is selected from least one of: (i) a polyvinyl acetal resin, (ii) a polyvinyl acetate, and (iii) a cellulose ester.

The second polymer is selected such that it forms a compatible polymer blend with the first polymer. In other words, it is an immiscible polymer blend that exhibits macroscopically uniform physical properties (which are usually caused by sufficiently strong interactions between the component polymers) under the intended conditions of the application. In the present disclosure, the second polymers listed were selected based on their Tg and molecular weights.

In one embodiment, the second polymer is a polyvinyl acetal resin. The polyvinyl acetal resin is produced by acetalizing a polyvinyl alcohol resin with an aldehyde having 4 or more carbon atoms and an aldehyde having 3 or less carbon atoms. The polyvinyl acetal resin generally has repeating units represented by Formula 1.

Regarding the polyvinyl alcohol resin, the polyvinyl alcohol resin may be produced by any method without particular limitation and may be produced by, for example, saponifying polyvinyl acetate or the like with an alkali, acid, or ammonia water. Furthermore, as the polyvinyl alcohol resin, a copolymer of a vinyl alcohol and a monomer copolymerizable with the vinyl alcohol, such as an ethylene-vinyl alcohol copolymer resin or a partially saponified ethylene-vinyl alcohol copolymer resin can be used. In addition, a modified polyvinyl alcohol resin where, for example, carboxylic acid is partially introduced can be used. These polyvinyl alcohol resins can be used alone or in combination of two or more.

Examples of the aldehyde having 3 or less carbon atoms used for producing the polyvinyl acetal resin include formaldehyde (including paraformaldehyde), acetaldehyde (including paraacetaldehyde), propionaldehyde, and the like. Examples of the aldehyde having 4 or more carbon atoms used for producing the polyvinyl acetal resin include butyl aldehyde, isobutyl aldehyde, n-octyl aldehyde, amyl aldehyde, hexyl aldehyde, heptyl aldehyde, 2-ethylhexyl aldehyde, cyclohexyl aldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, and the like. Methods of making polyvinyl acetal resins are known in the art, see for example U.S. Pat. Publ. No. 2011/0112247 (Tokuchi et al.), herein incorporated by reference.

The content of polyvinyl alcohol in the polyvinyl acetal resin typically ranges from about 10 to 30 wt-%. In some embodiments, the content of polyvinyl alcohol ranges from about 15 to 25 wt-%. Thus, "l" is selected accordingly.

The content of polyvinyl acetate in the polyvinyl acetal resin can be zero or range from 1 to 8 wt-%. In some

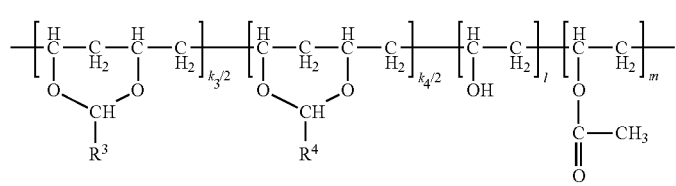

[Formula 1]

In Formula I, $R^3$ denotes an alkyl residue or a hydrogen atom of the aldehyde having 3 or less carbon atoms used in the acetalization reaction; $R^4$ denotes an alkyl residue of the aldehyde having 4 or more carbon atoms used in the acetalization reaction (note that each of the numbers of the carbon atoms of alkyl residues $R^3$ and $R^4$ is an integer i obtained by subtracting 1 from the number of the carbon atoms of the aldehyde used in the acetalization reaction and that when i is zero, $R^3$ denotes a hydrogen atom); $k_3$ denotes the molar ratio of the vinyl alcohol unit acetalized with the aldehyde having 3 or less carbon atoms; $k_4$ denotes the molar ratio of the vinyl alcohol unit acetalized with the aldehyde having 4 or more carbon atoms; l denotes the molar ratio of the vinyl alcohol unit not acetalized; and m denotes a molar ratio of the vinyl acetate unit. Note that m may be zero. Arrangement of the units is not particularly limited by the arrangement sequence shown in Formula 1. The polyvinyl acetal resin is typically a random copolymer, however, block copolymers and tapered block copolymers may provide similar benefits as random copolymers.

embodiments, the content of polyvinyl acetate ranges from about 1 to 5 wt-%. Thus, "m" is selected accordingly.

The content of polyvinyl alcohol in the polyvinyl acetal resin typically ranges from about 10 to 30 wt-%. In some embodiments, the content of polyvinyl alcohol ranges from about 15 to 25 wt-%. Thus, "l" is selected accordingly.

The content of polyvinyl acetate in the polyvinyl acetal resin can be zero or range from 1 to 8 wt-%. In some embodiments, the content of polyvinyl acetate ranges from about 1 to 5 wt-%. Thus, "m" is selected accordingly.

The content of polyvinyl acetal (e.g. butyral) in the polyvinyl acetal resin typically ranges from 65 wt-% up to 90 wt-%. In some embodiments, the content of polyvinyl acetyl (e.g. butyral) ranges from about 70 or 75 up to 80 or 85 wt-%. Thus, "$k_{3/2}$, $k_{4/2}$" are selected accordingly.

One of the most common polyvinyl acetal resins is polyvinyl butyral, however other polyvinyl acetal resins are contemplated in this disclosure. Polyvinyl butyral is commercially available from Kuraray under the trade designation "MOWITAL" and Solutia under the trade designation "BUTVAR".

The polyvinyl acetal resin typically has an average molecular weight (Mw) of at least 10,000 g/mole; 15,000 g/mole; 20,000 g/mole; or even 25,000 g/mole; and no greater than 150,000 g; 100,000 g/mole; 75,000 g/mole; or even 70,000 g/mole.

In some embodiments, the polyvinyl acetal resin has a Tg of between 60 to 75° C. or even 80° C. In some embodiments, the Tg of the polyvinyl acetal (e.g., butyral) resin is at least 65 to 70° C. When other aldehydes are used in the preparation of the polyvinyl acetal resin, the Tg may vary. For example, when n-octyl aldehyde is used, the Tg may be less than 65° C. or 60° C.

In one embodiment, the second polymer is polyvinyl acetate. Polyvinyl acetate (comprising a —$CH_2$—$CH(OC(=O)CH_3)$— repeat unit) can be prepared by the polymerization of a vinyl acetate monomer. Typically these are a homopolymer, however, small amounts (less than 10, 5, 2, 1 or even 0.5 mol %) of other polymerized monomers may be present.

The polyvinyl acetate typically has an average molecular weight (Mw) of at least 80,000 g/mole; 100,000 g/mole; or even 110,000 g/mole; and no greater than 700,000 g; 500,000 g/mole; or even 400,000 g/mole. In some embodiments, the polyvinyl acetate has a Tg of between 30 to 45° C.

In one embodiment, the second polymer is cellulose ester, preferably an aliphatic ester (i.e., an ester having an aliphatic acyl group). Examples of the aliphatic acyl group include an acetyl group, a propynyl group, and a butynyl group. Exemplary cellulose esters include: cellulose acetate, cellulose acetate propionate, cellulose acetate butyrate, cellulose acetate benzoate, cellulose propionate, and cellulose butyrate. The acetyl, propionyl and butyryl contents along with the hydroxy content can be determined by the method defined in ASTM-D817-96. In one embodiment, the cellulose ester has a hydroxyl group content from 0.8 to 5 wt % of the total second polymer.

Depending on the cellulose ester chosen, the molecular weight and Tg ranges may vary. In some embodiment, the cellulose ester typically has an average molecular weight (Mw) of at least 15,000 g/mole; 25,000 g/mole; 50,000 g/mole; or even 75,000 g/mole; and no greater than 300,000 g; 240,000 g/mole; or even 200,000 g/mole. In some embodiments, the cellulose acetate butyrate has a Tg of between 85° C. to 140° C., or even 100° C. to 140° C. For example, in some embodiments, the cellulose acetate propionate has a Tg of between 120° C. to 160° C., or even 140° C. to 160° C.

In the present disclosure, the first polymer is blended with the second polymer using techniques known in the art to form the polymeric blend. For example a mixing/kneading apparatus such a Banbury mixer, extruder, mixing roll, etc. can be used to combine the polymers to form a uniform composition. Alternatively, the polymers may be dissolved or suspended in a solution and then cast into a film. Additives, if used, can be added simultaneously with the first and second polymers or the additives can be premixed with one of the polymers and then added to the other polymer.

In one embodiment, the compositions of the present disclosure may be coated or extruded into a film or molded into a part.

In one embodiment, at least 30, 40, or even 50% and no more than 60, 70 or 80% by weight of the first polymer (the at least one acrylic block copolymer) is used versus the total weight of the first polymer and the second polymer. In one embodiment, at least 20, 30, or even 40% and no more than 50, 60 or 70% by weight of the second polymer is used versus the total weight of the first polymer and the second polymer.

In one embodiment, the first polymer comprises at least two different acrylic block copolymers.

In one embodiment, the composition consists essentially of the first polymer and the second polymer, meaning that the first and second polymer comprise at least 90, 92, 95, or even 98% by weight of the total composition.

In one embodiment, the composition comprising the blend of the first polymer and the second polymer further comprises an additive, such as a flame retardant, a bioactive filler, or other fillers ($TiO_2$) as is known in the art. In one embodiment, the composition comprises less than 30, 20, 10, 5, or even 1 part(s) of filler per hundred (pph) of the first polymer and the second polymer.

In one embodiment, the composition comprising the blend of the acrylic block copolymer and the second polymer further comprises a plasticizer. Plasticizers are materials, typically liquids, which are used to modify the processability or finished properties (e.g., flexibility or durability) of a polymer composition. Plasticizers are selected based on their compatibility with the polymers, and molecular weights. Exemplary plasticizers are known in the art and include for example, phthalate esters, sebacates (e.g., polyester sebacate), adipates (e.g., polyester adipate), phthalates (e.g., terephthalate), dibenzoates, glutarates (e.g., polyester glutarate), azelates, and combinations thereof. Commercially available polymeric plasticizers include those available under the trade designations "HALLSTAR", "PARAPLEX" and "PLASTHALL" by HallStar Co., Chicago, Ill.

In some embodiments, the polymeric blend composition (and articles comprising the polymeric blend) are substantially free of a plasticizer (in other words, less than 1, 0.5 or even 0.1 wt % of a plasticizer based on the amount of the polymer blend is used, or even no plasticizer is detectable in the composition). In other embodiments, a plasticizer may be used. When a plasticizer is used, it may be used at levels of 1 to 20 phh, 1 to 10 phh, even 1 to 3 phh (part(s) of plasticizer per hundred) of the first polymer and the second polymer. The use of the plasticizer may depend, for example, on the selection of the first polymer and second polymer, and/or the additional components added. For example, in the case of a cellulose ester second polymer, the higher the butyryl content of the cellulose ester at a given viscosity, the greater its flexibility and the lower the need for plasticizer to achieve a given flexibility. In some embodiments, a filler, such as a whitening agent (e.g., $TiO_2$) may be added to the polymer blend. As more filler is added to the composition, the composition can become stiff and therefore, a plasticizer may be used to help soften the polymeric blend composition.

In one embodiment, the polymeric blend composition (and articles comprising the polymeric blend) further comprise a traditional tackifier, which are known in the art (e.g., rosins and their derivatives; polyterpenes and aromatic-modified polyterpene resins; coumarone-indene resins; hydrocarbon resins, for example, alpha pinene-based resins, beta pinene-based resins, limonene-based resins, aliphatic hydrocarbon-based resins, aromatic-modified hydrocarbon-based resins, etc. A tackifier may be used to further modify the softening temperature of the polymeric blend composition for particular applications so long as the polymeric blend composition is non-tacky. In one embodiment, the polymeric blend composition (and articles comprising the polymeric blend) comprises less than 50, 40, 30, 20, 10, 5, 2, 1, 0.5 pph (parts per hundred) of the first polymer and the second polymer.

In one embodiment, a solvent may be added to the blend of the first polymer and the second polymer to enable coating and/or make a spray. In one embodiment, the composition comprises at least 60, 65 or even 70% and at most 75 or even 80% by weight of a solvent based on the total weight of the first polymer, the second polymer and the solvent. Exemplary solvents include alcohol (e.g., isopropanol, and ethanol), acetone, toluene, methyl ethyl ketone, alkyl acetates (e.g., ethyl acetate, and cyclohexane tertiary butyl acetate), and mixtures thereof. Preferably, in one embodiment the solvent is a non-VOC (volatile organic compound) solvent according to 40 CFR (Code of Federal Regulations) § 51.100(s) as of the date of filing. Exemplary non-VOC solvents include: tert-butyl acetate, dimethyl carbonate, methyl acetate, acetone, and mixtures thereof.

In one embodiment, the polymeric blend of the present disclosure, comprising the first polymer and the second polymer, has properties similar to PVC. For example, in one embodiment, the polymeric blend has a first modulus at 35° C. of at least $10^6$ Pa, $5\times10^6$ Pa, or even $10^7$ Pa; a second modulus at 150° C. that is at least 1 order of magnitude less than the first modulus; and wherein the tan delta is less than 1.1, 1.0, or even 0.9 at 150° C.

Since the block copolymers have a saturated polymeric backbone, in one embodiment, the articles made from these polymeric materials tend to be resistant to weather-induced (e.g., ultraviolet radiation-induced and oxidation-induced) degradation.

In one embodiment, the resulting article can be optically clear. As used herein, the term "optically clear" refers to a material that has a luminous transmission of at least about 90 percent, a haze of less than about 2 percent, and opacity of less than about 1 percent in the 400 to 700 nm wavelength range. Both the luminous transmission and the haze can be determined using, for example, ASTM-D 1003-95. The optically clear material tends to be visually free of bubbles.

The polymeric blend can be made into a film via coating or casting; or molded into an article. In one embodiment the polymeric blend is a graphic film, printable film or graphic protection film.

Graphic films are used, for example, to apply designs, e.g., images, graphics, text and/or information, on buildings, pavements, windows, or vehicles such as autos, cans, buses, trucks, streetcars, and the like for e.g., advertising or decorative purposes. Many of the surfaces, e.g., vehicles are irregular and/or uneven. For graphic films, it is desirable to have a film that accommodates curves, depressions or projections on a substrate surface so that the film may be stretched around curves or projections, or may be pressed down into depressions without breaking or de-laminating the film. This characteristic is generally referred to as conformability. It is also desirable that the film and adhesive composite does not release from the substrate surface after application ("popping-up"). Graphic films may be of any color. Graphic films may also be imageable (i.e., able to receive printing and/or graphic) and exhibit good weathering for outdoor applications.

The resulting articles and polymeric blend compositions disclosed herein are not adhesives. The resulting articles are preferably non-tacky to the touch at room temperature (25° C.) and preferably at (e.g. storage or shipping) temperatures ranging up to (120° F.) 50° C. The compositions are tack-free meaning that they do not satisfy the Dahlquist criterion for tack. In other words, the blend compositions of the present disclosure have a storage modulus (G') greater than $3\times10^5$ Pascals at 25° C. with a test frequency of 1 radian/sec. Thus, the resulting articles and/or polymeric blend composition is not a pressure sensitive adhesive in accordance with the Dahlquist criteria.

Examples

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, hr=hour; mol=mole; cm=centimeter; mm=millimeter; Pa=Pascal; psi=pressure per square inch; phr=parts per hundred rubber; rpm=revolutions per minute; MPa=megaPascals; and wt=weight.

Materials

| Material | Description |
|---|---|
| Antioxidant | Available under the trade designation "IRGANOX 1076" available from Aldrich |
| PVC | A cast polyvinyl chloride vinyl film used in "3M CONTROLTAC GRAPHIC FILM IJ180"available from 3M Co., St. Paul, MN |
| ABC A | Acrylic block copolymer available under the trade designation "KURARITY LA4285" from Kuraray Co. Ltd., comprising 51 wt % of PMMA. |
| ABC B | Acrylic block copolymer available under the trade designation "KURARITY LA2250" from Kuraray Co. Ltd., comprising 33 wt % of PMMA. |
| PVB A | Polyvinyl butyral available from Sigma-Aldrich. PVOH content 18-20 wt %, PVAC content 0-1.5 wt %, Tg = 72-78° C., MW = 70 kg/mol to 100 kg/mol. |
| PVB B | Polyvinyl butyral "Mowital B 30 T" available from Kurary Co. Ltd., PVOH content 24-27 wt %, PVAC content 1.0-4.0 wt %, Tg = 70° C., MW = 33 kg/mol. |
| PVB C | Polyvinyl butyral "Mowital B 45 H" available from Kurary Co. Ltd., PVOH content 18-21 wt %, PVAC content 1.0-4.0 wt %, Tg = 69° C., MW = 43 kg/mol. |
| PVB D | Polyvinyl butyral "Mowital B 60 T" available from Kurary Co. Ltd., PVOH content 24-27 wt %, PVAC content 1.0-4.0 wt %, Tg = 72° C., MW = 55 kg/mol. |
| PVB E | Polyvinyl butyral "Mowital B 60 H" available from Kurary Co. Ltd., PVOH content 18-21 wt %, PVAC content 1.0-4.0 wt %, Tg = 70° C., MW = 55 kg/mol. |
| PVB F | Polyvinyl butyral "Mowital B 60 HH" available from Kurary Co. Ltd., PVOH content 16-21 wt %, PVAC content 1.0-4.0 wt %, Tg = 65° C., MW = 55 kg/mol. |
| PVB G | Polyvinyl butyral "Mowital B 30 H" available from Kurary Co. Ltd., PVOH content 18-21 wt %, PVAC content 1.0-4.0 wt %, Tg = 68° C., MW = 33 kg/mol. |
| PVA A | Polyvinyl acetate available from Aldrich, Tg = 30° C., MW = 167 kg/mol. |
| PVA B | Polyvinyl acetate "Vinnapas UW 1FS" available from Wacker, Tg = 43° C., MW = 110-115 kg/mol. |
| PVA C | Polyvinyl acetate "Vinnapas UW 4FS" available from Wacker, Tg = 44° C., MW = 270-310 kg/mol. |
| PVA D | Polyvinyl acetate "Vinnapas UW 10FS" available from Wacker, Tg = 44° C., MW = 330-430 kg/mol. |
| CA A | Cellulose Acetate Propionate available as "TENITE PROPIONATE 380A40000018" from Eastman, Tg = 158° C., comprising about 18% plasticizer |

-continued

| Material | Description |
|---|---|
| CA B | Cellulose Acetate Propionate available as "TENITE PROPIONATE 307E4000022" from Eastman, Tg = 153° C. |
| CA C | Cellulose Acetate Butyrate available as "CAB553-0.4" from Eastman, Tg = 136° C. |
| CA D | Cellulose Acetate Butyrate available as "CAB551-0.2" from Eastman, Tg = 101° C. |

Compounding and Hot-Melt Mixing:

Each sample (25 g) as described in the tables (except for CEO, which was used as received) was dry blended with 0.2 phr of antioxidant then charged into a Brabender 25-gram capacity bowl mixer. The components were mixed at 165° C. for 5 minutes at 50 rpm. The sample was then hot-pressed between sheets of release coated polyester film using a Carver platen press with the platens maintained at 165° C. for 1 minute to a thickness ranging from 100 to 175 micrometers. The films were then conditioned in a constant temperature and humidity room maintained at 72° F. and 50% relative humidity overnight prior to testing.

Dynamic Mechanical Analysis:

Samples were tested for dynamic mechanical properties in a parallel plate rotational shear geometry 8 mm in diameter using a rheometer (AR2000EX Dynamic Mechanical Analyzer, TA Instrument Inc. New Castle, Del.). The films were stacked to achieve a test sample thickness between 1 and 2 mm. Using a constant angular oscillation frequency of 1 radian/sec, the sample temperature was ramped at a rate of 3° C./minute from 120° C. temperature to −20° C. with a strain of 1% until the shear stress exceeded $1 \times 10^5$ Pa. Then the instrument shifted to a constant stress mode maintaining $1 \times 10^5$ Pa and allowing the strain to drop as the sample modulus increased. The temperature was then ramped from 120° C. to 200° C. with a constant strain of 5%. Storage modulus (G') and tan delta (tan δ) were recorded. Selected values of these parameters at 35° C., and 150° C. were tabulated.

Tensile Strength and Elongation at Break test: Samples were tested by using an Instron 4501 Tensile Tester available from Instron Corp., Norwood, Mass. A 1 inch (25.4 mm) long×0.5 inch (12.7 mm) wide sample was held into the upper and lower jaws of the Instron and was pulled at 12 in/min (304.8 mm/min) until it broke. The tensile strength in psi (and MPa) and elongation at break in percentage (%) were recorded. Testing was performed at controlled laboratory conditions of 22° C. and 50% relative humidity.

Shown in the Tables below are the compositions of acrylic block copolymer and second polymer (in wt %) for the comparative examples (CE) and Examples (Ex) and the resulting storage modulus (G') and tan delta (tan δ) at various temperatures along with the tensile strength and elongation at break. Open cells mean that the component was not added.

TABLE 1

| Sample | ABC A | ABC B | Type/Amount | G' (Pa) 35° C. | G' (Pa) 150° C. | Tan δ 150° C. | Tensile Strength psi (MPa) | Break Elong. (%) |
|---|---|---|---|---|---|---|---|---|
| CE O | | | PVC | 1.41E+07 | 0.45E+06 | 0.27 | 3614 (24.91) | 196 |
| CE A | | | PVA A/100 | 5.04E+07 | 6.44E+02 | 3.29 | 5974 (41.18) | 6 |
| Ex 1 | | 50 | PVA A/50 | 1.80E+07 | 1.42E+04 | 1.01 | 1775 (12.23) | 160 |
| Ex 2 | 40 | 27 | PVA A/30 | 2.50E+07 | 3.09E+04 | 0.84 | 4284 (29.53) | 270 |
| CE B | | | PVA B/100 | 5.58E+08 | 7.44E+02 | 5.20 | 6047 (41.69) | 4 |
| Ex 3 | 33.33 | 22.22 | PVA B/44.44 | 6.40E+07 | 2.11E+04 | 0.95 | 3179 (21.91) | 245 |
| CE C | | | PVA C/100 | 5.80E+08 | 1.66E+04 | 1.22 | 5202 (35.86) | 3 |
| Ex 4 | 33.33 | 22.22 | PVA C/44.44 | 4.20E+07 | 3.96E+04 | 0.93 | 3416 (23.55) | 318 |
| CE D | | | PVA D/100 | 5.30E+08 | 3.63E+04 | 0.82 | 4221 (29.10) | 4 |
| Ex 5 | 33.33 | 22.22 | PVA D/44.44 | 2.80E+07 | 4.17E+04 | 0.80 | 3447 (23.76) | 256 |

TABLE 2

| Sample | ABC A | ABC B | Type/Amount | G' (Pa) 35° C. | G' (Pa) 150° C. | Tan δ 150° C. | Tensile Strength psi (MPa) | Break Elong. (%) |
|---|---|---|---|---|---|---|---|---|
| CE E | 100 | | | 5.00E+07 | 1.12E+05 | 0.51 | 1353 (9.32) | 302 |
| CE F | | 100 | | 4.09E+05 | 2.40E+04 | 0.86 | 1445 (9.96) | 562 |
| CE G | 90 | 10 | | 1.98E+07 | 1.16E+05 | 0.60 | 2370 (16.34) | 254 |
| CE H | 50 | 50 | | 3.10E+07 | 6.48E+04 | 0.60 | 2362 (16.28) | 415 |
| CE I | | | PVB B/100 | x | 6.75E+02 | 4.16 | 8539 (58.87) | 9 |
| Ex 6 | 50 | 5.56 | PVB B/44.44 | 1.40E+08 | 8.01E+04 | 0.74 | 3225 (22.23) | 104 |
| Ex 7 | 33.33 | 33.33 | PVB B/33.33 | 1.20E+07 | 2.25E+04 | 0.91 | 3018 (20.80) | 171 |
| Ex 8 | 33.33 | 33.33 | PVB G/33.33 | 2.70E+07 | 3.88E+04 | 0.89 | 2570 (17.71) | 165 |
| CE J | | | PVB C/100 | 6.30E+08 | 1.73E+04 | 2.28 | 7214 (49.73) | 9 |
| Ex 9 | 50 | 5.56 | PVB C/44.44 | 4.50E+07 | 4.76E+04 | 1.03 | 3506 (24.17) | 126 |
| CE K | | | PVB D/100 | 1.12E+08 | 2.70E+04 | 1.47 | 5801 (39.99) | 7 |
| Ex 10 | 50 | 5.56 | PVB D/44.44 | 8.70E+07 | 8.66E+04 | 0.87 | 4203 (28.97) | 143 |
| CE L | | | PVB E/100 | x | 2.89E+04 | 1.53 | 5194 (35.81) | 42 |
| Ex 11 | 50 | 5.56 | PVB E/44.44 | 1.08E+08 | 7.88E+04 | 0.88 | 4089 (28.19) | 162 |
| CE M | | | PVB F/100 | x | 1.99E+04 | 1.36 | 8495 (58.57) | 8 |
| Ex 12 | 50 | 5.56 | PVB F/44.44 | 1.10E+08 | 4.17E+04 | 0.89 | 3654 (25.19) | 152 |
| Ex 13 | 33.33 | 33.33 | PVB F/33.33 | 1.80E+07 | 6.72E+04 | 0.77 | 2424 (16.71) | 125 |

TABLE 2-continued

| Sample | ABC A | ABC B | Type/Amount | G' (Pa) 35° C. | G' (Pa) 150° C. | Tan δ 150° C. | Tensile Strength psi (MPa) | Break Elong. (%) |
|---|---|---|---|---|---|---|---|---|
| CE N |  |  | PVB A/100 | 1.80E+08 | 9.32E+03 | 2.33 | 5120 (35.30) | 32 |
| Ex 14 |  | 50 | PVB A/50 | 1.10E+07 | 1.56E+04 | 1.47 | 1619 (11.16) | 97 |
| Ex 15 | 50 | 5.53 | PVB A/44.44 | 3.90E+07 | 4.21E+04 | 1.08 | 3583 (24.70) | 189 |

Where x indicates that the material was too stiff to maintain bond to the test fixture

TABLE 3

| Sample | ABC A | ABC B | Type/Amount | G' (Pa) 35° C. | G' (Pa) 150° C. | Tan δ 150° C. | Tensile, psi (MPa) | Break (%) |
|---|---|---|---|---|---|---|---|---|
| Ex 16 | 33.33 | 33.33 | CA A/33.33 | 4.70E+07 | 6.89E+04 | 0.81 | 1078 (7.43) | 11 |
| Ex 17 | 33.33 | 33.33 | CA B/33.33 | 4.10E+07 | 6.95E+04 | 0.81 | 1602 (11.04) | 39 |
| Ex 18 | 33.33 | 33.33 | CA C/33.33 | 1.50E+07 | 9.42E+04 | 0.76 | 2512 (17.31) | 130 |
| Ex 19 | 33.33 | 33.33 | CA D/33.33 | 6.50E+07 | 3.22E+04 | 1.02 | 2105 (14.51) | 178 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A polymeric blend comprising:
   (i) a first polymer comprising at least one acrylic block copolymer, wherein the at least one acrylic block copolymer comprises:
      (a) at least two A block polymeric units wherein each A block has a glass transition temperature of at least 90° C. and each A block is independently derived from a monoethylenically unsaturated monomer comprising a first (meth)acrylate monomer; and
      (b) at least one B block polymeric unit wherein the at least one B block has a glass transition temperature no greater than −30° C. and wherein the at least one B block is derived from a monoethylenically unsaturated monomer comprising a second (meth)acrylate monomer; and
   (ii) a second polymer comprising a polyvinyl acetal resin, wherein the polyvinyl acetal resin is obtained by acetalizing a polyvinyl alcohol resin with an aldehyde having 4 or more carbon atoms and an aldehyde having 3 or less carbon atoms; and
wherein the polymeric blend has less than 1 wt. % of plasticizer;
wherein the first polymer comprises a first acrylic block copolymer comprising 45-60 wt % of the at least two A block polymeric units and a second acrylic block copolymer comprising 20-45 wt % of the at least two A block polymeric units.

2. The polymeric blend according to claim 1, wherein the polyvinyl acetal resin comprises polyvinyl butyral.

3. The polymeric blend according to claim 1, wherein the first polymer comprises 20 to 60 wt % of the at least two A block polymeric units.

4. An article comprising the polymeric blend of claim 1.

5. A method of making the polymeric blend of claim 1 comprising:
   (i) providing the first polymer comprising at the least one acrylic block copolymer.

6. The polymeric blend according to claim 1, wherein the first (meth)acrylate monomer is selected from at least one of methyl methacrylate, isobornyl acrylate, and methyl acrylate.

7. The polymeric blend according to claim 1, wherein the second (meth)acrylate monomer is selected from at least one of butyl acrylate, isooctyl acrylate, n-octyl acrylate, and 2-ethylhexyl acrylate.

8. The polymeric blend according to claim 1, wherein the polymeric blend comprises 30-80 wt % of the acrylic block copolymer versus the total weight of the first polymer and the second polymer.

9. The polymeric blend according to claim 1, wherein the polymeric blend comprises 20-70 wt % of the second polymer versus the total weight of the first polymer and the second polymer.

10. The polymeric blend according to claim 1, further comprising a tackifier.

11. The polymeric blend according to claim 10, wherein the amount of tackifier is less than 30 pph of the first polymer.

12. The polymeric blend according to claim 1, wherein the polymeric blend is substantially tack-free.

13. The polymeric blend according to claim 1, wherein the polymeric blend comprises a flame retardant.

14. The polymeric blend according to claim 1, wherein the polymeric blend comprises 60-80 wt % of a solvent based on the total weight of the first polymer, the second polymer and the solvent.

* * * * *

UNITED STATES PATENT AND TRADEMARK OFFICE
CERTIFICATE OF CORRECTION

PATENT NO. : 10,287,427 B2  
APPLICATION NO. : 15/516419  
DATED : May 14, 2019  
INVENTOR(S) : David J. Yarusso et al.

Page 1 of 1

It is certified that error appears in the above-identified patent and that said Letters Patent is hereby corrected as shown below:

In the Claims

<u>Column 16</u>
Line 27, In Claim 5, delete "copolymer." and insert -- copolymer; (ii) blending the acrylic block copolymer with the second polymer. --, therefor.

Signed and Sealed this
Eighth Day of October, 2019

Andrei Iancu
*Director of the United States Patent and Trademark Office*